April 6, 1926. 1,579,911
B. C. BERRY
CORN SERVER
Filed April 15, 1925
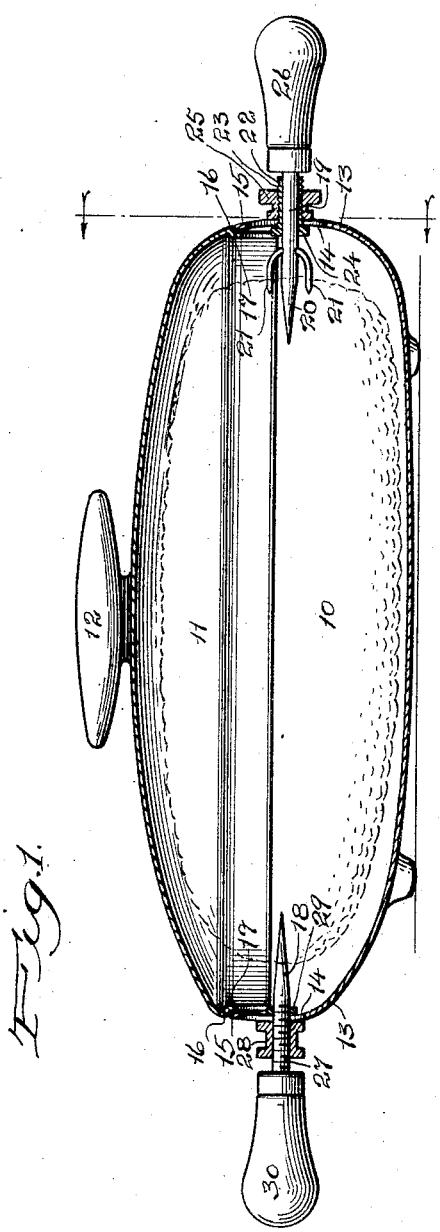
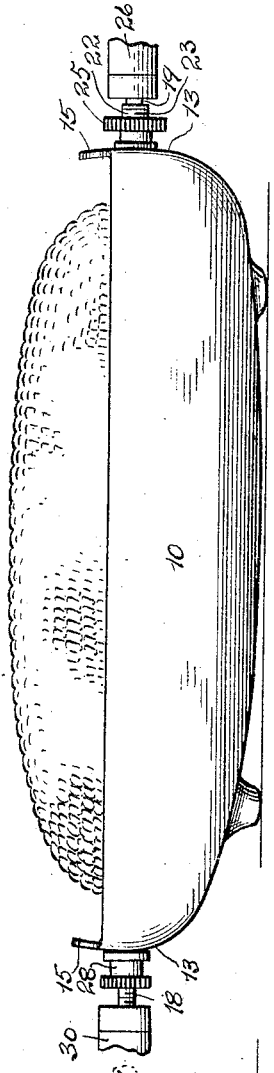
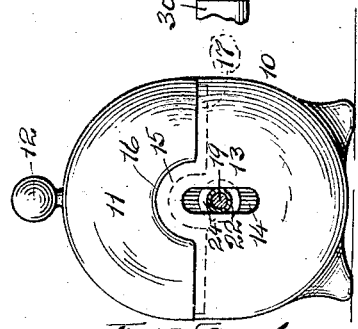
Inventor:
Bert C. Berry.

Patented Apr. 6, 1926.

1,579,911

UNITED STATES PATENT OFFICE.

BERT C. BERRY, OF ALTADENA, CALIFORNIA, ASSIGNOR TO BERRY CORN SERVER, INC., OF LOS ANGELES, CALIFORNIA, A CORPORATION OF CALIFORNIA.

CORN SERVER.

Application filed April 15, 1925. Serial No. 23,218.

*To all whom it may concern:*

Be it known that I, BERT C. BERRY, a subject of the King of Great Britain, residing at Altadena, in the county of Los Angeles and State of California, have invented certain new and useful Improvements in Corn Servers, of which the following is a specification.

This invention relates to a server for a single ear of sweet corn, and the object of the invention is to so construct and arrange the server that it will constitute a closed serving dish for the ear of corn, which will serve to keep the corn hot until it is eaten, and will also serve as a desirable and convenient holder for the ear while being eaten.

Furthermore, the server is so constructed that it will readily adapt itself for use in the serving of ears of varying diameter, and in all cases will afford a dish for the retention of melted butter into which the lower surface of the ear of corn will be immersed, so that the ear may be eaten without inconvenience and without soiling the fingers with the butter, and without in any way bringing the fingers into actual contact with the ear of corn. The server is also constructed in such a way as to present an attractive appearance as an article of table silverware.

Further objects of the invention will appear from a detailed description thereof, wherein—

Figure 1 is a sectional elevation of the server;

Fig. 2 is a side view with cover removed; and

Fig. 3 is an end elevation.

The server comprises an elongated dish or receptacle 10 provided with a cover 11 having a handle 12 to facilitate in removing the cover. The body of the dish may be configured in any desirable or attractive manner, but it is preferably of a size to receive an ear of corn of the largest dimension which it is intended to serve, the arrangement being such, however, as to permit the server to accommodate ears of varying sizes.

The end walls 13 of the dish are provided with vertical slots 14—14, which preferably extend up into an upward arched extension 15 of arch formation, as best indicated in Fig. 3.

The cover is configured to fit snugly over the rim of the dish and is inwardly recessed at its end 16 to accommodate the arches 15, the rim of the cover throughout being provided with an inturned flange 17 which serves to reinforce the edge of the cover and engage the inner side of the rim of the dish in a manner customary in the construction of silver dishes for table service.

The slots 14 afford guideways for carrying the devices whereon the ear of corn is impaled, which devices comprise a smooth pointed prong 18 at one end of the dish, and a tined prong 19 at the other end of the dish, the prongs being alined with one another when in use.

The prong 19 is preferably provided with a center point 20 and shorter side tines 21, and the shank of the tine prong extends through a sleeve 22 of a diameter to permit of vertical adjustment within the slot 14 to accommodate ears of different diameter. The sleeve 22 is provided on its exterior with threads 23, and at its inner end is provided with a flange 24 which bears against the inner margin of the slot and co-operates with a thumb nut 25 threaded onto the sleeve, so that after vertical adjustment of the sleeve to the desired degree the thumb nut can be screwed down to clamp the sleeve at the desired point of adjustment.

The outer end of the tined prong is provided with a knob or handle 26 which serves to manipulate said prong and also acts as a support for the dish when the ear of corn is being eaten.

The smooth prong 18 is provided with threads 27 to receive a thumb nut 28 which co-operates with a collar 29 to clamp the prong in the desired position of adjustment, and the prong 18 is provided with a knob or handle 30 similar to the handle 26.

In use, the thumb nuts are loosened up to permit adjustment of the prongs, and the tined prong is drawn back outwardly to permit an ear of corn to be laid within the dish, with one end journaled upon the smooth prong and the other end ready to be impaled by the tined prong. When the ear has been properly positioned, the tined prong is thrust inwardly to impale the end of the ear, and the thumb nuts are then tightened up to hold the ear at such height as will permit the ear to be completely rotated without interference with its surface in close proximity to the bottom of the dish. The proper amount of melted butter is then poured into the dish and flavored by the required amount of salt, and the dish is then covered and ready for serving.

In using the server, the cover will be removed and the handles grasped with the fingers and the server lifted and tilted to bring the exposed surface of the ear of corn into position to be eaten. The handle or knob 30, being rigidly held against rotation, serves as a convenient means for tilting the dish to the desired degree, while the knob 26 on the tined prong permits the ear to be rotated from time to time in order to expose a fresh surface, the arched arrangement of the ends permitting substantially half of the surface of the ear to project above the rim of the dish so that no inconvenience will be experienced in biting the kernels of corn from the ear. At the same time, the lower portion of the unexposed surface of the ear will be immersed in the melted butter, and the ear may be turned from time to time to secure the proper coating of butter to impart the desired flavor to the corn.

The arrangement is one which affords a ready and convenient means for lifting and tilting the dish, and at the same time for manipulating the contained ear, without ever touching the fingers to the ear, and at the same time the arrangement affords a much more convenient and desirable method of coating the ear with butter than that commonly observed in the ordinary method of eating corn from the cob.

Although the invention has been described with considerable particularity as to detail, it is obvious that the construction shown might be modified to a considerable degree without departing from the spirit of the invention.

I claim:

1. In a corn server, the combination of an elongated dish provided with vertical slots in its end walls, a cover for the dish, a prong extending through each of the slots, one of the prongs being provided with tines, a sleeve through which the tined prong is slidably entered, a thumb nut threaded onto the said sleeve for clamping the same in vertically adjusted position, and a thumb nut threaded onto the companion prong for clamping the same in vertically adjusted position, substantially as described.

2. In a corn server, the combination of a dish having at each end an inwardly projecting prong terminating at its outer end in an external handle, the handle being adapted to manipulate the dish, one of the prongs being longitudinally movable to impale an ear of corn, each of said prongs being vertically adjustable to accommodate ears of different sizes, and means associated with the ends of the dish for clamping said prongs to the dish after vertical adjustment, substantially as described.

3. In a corn server, the combination of a dish having at each end a prong entered through the proximate end of the dish and terminating at its outer end in a handle, the two prongs being in aligned relation, the handles being connected with the dish and serving as a means for lifting and manipulating the same, and one of the prongs with its handle being longitudinally movable to impale an ear of corn, substantially as described.

4. In a corn server, the combination of a dish having at each end a prong entered through the proximate end of the dish and terminating at its outer end in a handle, the two prongs being in aligned relation, and the handles being connected with the dish and serving as a means for lifting and manipulating the same, and one of the prongs with its handle being longitudinally movable to impale an ear of corn, and rotatable to rotate said ear, substantially as described.

5. In a corn server, the combination of a dish provided at each end with a vertical slot, a prong provided with an external handle and entered through each of said slots and vertically adjustable therein, one of the prongs being provided with tines and being rotatable, and means associated with the prongs for clamping the same in adjusted relation to the dish, substantially as described.

6. In a corn server, the combination of a dish provided at each end with a vertical slot, a prong provided with an external handle and entered through each of said slots and vertically adjustable therein, and means associated with the prongs for clamping the same in adjusted relation to the dish, and the tined prong being longitudinally adjustable, substantially as described.

7. In a corn server, the combination of a dish provided at each end with a vertical slot bridged over by an arch upwardly projecting from the rim of the dish, a prong extending through each of said vertical slots and adjustable therein, and terminating at its outer end in a handle, said handles serving as means for lifting the dish, one of the prongs being provided with means for engaging the proximate end of an ear of corn for rotating the same, and the other prong affording a pivot for such rotation, and means for clamping the prongs to the dish, substantially as described.

8. In a corn server, the combination of a dish provided at each end with a vertical slot bridged over by an arch upwardly projecting from the rim of the dish, a prong extending through each of said vertical slots and adjustable therein, and terminating at its outer end in a handle, said handle serving as means for lifting the dish, one of the prongs being provided with means for engaging the proximate end of an ear of corn for rotating the same, the other prong affording a pivot for such rotation, and means for clamping the prongs to the dish, one of the prongs being longitudinally adjustable while in clamped position, substantially as described.

BERT C. BERRY.